United States Patent [19] — [11] 3,925,264
Corte et al. — [45] Dec. 9, 1975

[54] PROCESS FOR THE PRODUCTION OF ANION EXCHANGERS

[75] Inventors: Herbert Corte, Oplanden; Harold Heller, Cologne; Otto Netz, Leverkusen, all of Germany

[73] Assignee: Bayer Aktiengesellschaft, Germany

[22] Filed: Aug. 7, 1974

[21] Appl. No.: 495,441

Related U.S. Application Data

[63] Continuation of Ser. No. 338,886, March 2, 1973, abandoned.

[30] Foreign Application Priority Data

Mar. 8, 1972    Germany .......................... 2211134

[52] U.S. Cl. .......... 260/2.1 E; 260/85.1; 260/80.78; 260/88.2 C; 260/88.2 S; 260/DIG. 6
[51] Int. Cl.$^2$ .................. C08F 8/02; C08F 8/12; C08F 257/02
[58] Field of Search .................. 260/2.1 E, DIG. 6

[56] References Cited
UNITED STATES PATENTS

| | | | |
|---|---|---|---|
| 3,006,866 | 10/1961 | Corte et al. | 260/2.1 |
| 3,316,186 | 4/1967 | Geyer et al. | 260/2.1 |
| 3,405,091 | 10/1968 | Sprengling et al. | 260/47 |

FOREIGN PATENTS OR APPLICATIONS

| | | |
|---|---|---|
| 134,980 | 10/1902 | Germany |
| 1,168,080 | 4/1964 | Germany |

OTHER PUBLICATIONS

Olah, Friedel–Crafts and Related Reactions, Vol. I, Interscience, 1963, (pp. 32–33, 46, 626, 685).
Olah, Friedel–Crafts and Related Reactions, Vol. II, Interscience, 1964, (pp. 477–478, 486).
Flory, Principles of Polymer Chemistry; Cornell Univ. Press., Ithaca, N.Y., 1953.

*Primary Examiner*—Melvyn I. Marquis
*Assistant Examiner*—T. Pertilla
*Attorney, Agent, or Firm*—Connolly and Hutz

[57] ABSTRACT

A synthetic anion exchange resin is prepared by condensing a crosslinked insoluble organic polymer containing at least one aromatic nucleus with an N-hydroxalkyl imide in the presence of a swelling agent and a Friedel-Crafts catalyst, continuously removing from the reaction mixture the water formed therein, and hydrolyzing the reaction product.

8 Claims, No Drawings

PROCESS FOR THE PRODUCTION OF ANION EXCHANGERS

CROSS-REFERENCE TO RELATED APPLICATION

This application is a continuation of application Ser. No. 338,886 filed Mar. 2, 1973, and now abandoned.

This invention relates to a process for the production of synthetic resins with anion-exchanging properties.

It is known from U.S. Pat. No. 3,006,866 that synthetic resins with anion-exchanging properties can be obtained by condensing crosslinked. insoluble organic polymers containing aromatic nuclei with N-halogen alkyl imides in the presence of Friedel-Crafts catalysts and swelling agents, and hydrolysing the resulting compounds. By means of this process, it is possible to introduce more than one imidoalkylene group per aromatic nucleus and, hence, to produce high-capacity anion exchangers.

The N-halogen alkylimides required for carrying out this process are obtained from the corresponding N-hydroxyalkyl imides by reaction with hydrohalic acids or with compounds such as thionyl chloride or sulphuryl chloride.

According to the invention there is provided a process for the production of a synthetic anion-exchange resin, in which at least one cross-linked, insoluble organic polymer containing at least one aromatic nucleus is condensed with at least one N-hydroxyalkyl imide in the presence of at least one swelling agent and of at least one Friedel-Crafts catalyst, the water formed during the condensation reaction being continuously removed from the reaction mixture, and the reaction product thus obtained being hydrolysed.

The advantage of the process according to the invention over the procedure described in U.S. Pat. No. 3,006,866, is that the N-hydroxyalkyl imides can be directly reacted with the crosslinked polymers without any need for the corresponding N-halogen alkylimides to be prepared beforehand from the N-hydroxyalkyl imides. In addition, the use of N-halogen alkylimides described in U.S. Pat. No. 3,006,866 has the disadvantage that, during condensation, one mol of hydrogen halide is liberated per mol of N-halogen alkylimides, which involves further outlay in terms of apparatus.

In one preferred embodiment of the process according to the invention, an N-hydroxyalkyl imide is reacted with a cross-linked polymer which contains aromatic nuclei, in the presence of a Friedel-Crafts catalyst and a swelling agent and also in the presence of small quantities of a hydrogen halide or of a compound which liberates a hydrogen halide under the reaction conditions.

Surprisingly, the addition of small quantities of hydrogen halide or of compounds which liberate hydrogen halide increases the number of imidoalkyl groups introduced into the crosslinked polymer per aromatic nucleus. The addition of hydrogen halide either directly or in the form of a compound which liberates hydrogen halide is not made in equimolar quantities, based on the quantity of N-hydroxyalkyl imide reacted; it is always smaller than the necessary equimolar quantity, quantities of from 0.1 to 0.5 mols being preferred.

Table (I) shows the results obtained with different catalysts, 200 g of N-hydroxymethyl phthalimide, 400 g of ethylene chloride, 50 g of styrene bead polymer (crosslinked with 2 or 4 % of divinyl benzene) and 10 g of catalyst, being used for each test. The following procedure was adopted: the styrene bead polymer was caused to swell with ethylene chloride; and the reaction mixture, after addition of N-hydroxymethyl phthalimide, the particular catalyst and, optionally, a certain quantity of hydrogen chloride, was heated to its boiling point over a period of 20 hours. After cooling, the reaction liquid was filtered off under suction and the beads washed once with ethylene chloride and once with methanol. The beads were then heated for 6 hours to 80°-90°C with 300 ml of methanol, 100 g of hydrazine hydrate, 100 ml of 45 % sodium hydroxide and 300 ml of water, filtered under suction, washed with water and dilute hydrochloric acid (1 : 5) and then heated for another 6 hours to 80°-85°C. with 400 ml of 10 % hydrochloric acid. After the phthalhydrazide formed had been washed out with dilute sodium hydroxide, the anion-exchange resin obtained was washed until neutral in a filter tube.

The Table also shows how the number of imidoalkyl groups introduced into the crosslinked polymer per aromatic nucleus is increased by the addition of small quantities of hydrogen chloride.

Table (I)

| Catalyst | Reaction conditions | g hydrogen chloride | imidoalkyl groups per aromatic nucleus 2 % DVB | 4 % DVB |
|---|---|---|---|---|
| $FeCl_3$ | I | — | <0.1 | <0.1 |
| $FeCl_3$ | II | — | 1.45 | 1.10 |
| $FeCl_3$ | | | | |
| $ZnCl_2$ | II | — | <0.1 | <0.1 |
| $ZnCl_2$ | II | 3 | 1.93 | 1.48 |
| $SnCl_4$ | II | — | 0.25 | 0.17 |
| $SnCl_4$ | II | 4 | 1.95 | 1.30 |
| $H_2SO_4$ (20 ml) | II | — | — | 0.43 |
| $H_2SO_4$ (20 ml) | II | 6 | — | 0.74 |

The reaction conditions I and II differ from one another in regard to the treatment of the water of reaction evolved during the condensation reaction. Thus, under I, the solvent is refluxed without removing any water of reaction from the reaction system, whereas, under II, the water of reaction is removed from the reaction system.

The organic polymers which can be used in the process according to the invention are known per se. Particularly suitable organic polymers include crosslinked polymers and copolymers based on aromatic vinyl compounds, such as styrene, vinyl toluene, ethyl styrene or vinyl naphthalene, and also copolymers of aromatic monovinyl compounds with other monoolefinically unsaturated compounds, such as ethylene, propylene, or compounds with conjugated double bonds, such as butadiene or chloroprene.

Suitable crosslinking agents include aromatic or aliphatic compounds with several vinyl groups such as, for example, divinyl benzene, substituted divinyl benzenes such as, for example, divinyl toluene, divinyl xylene, divinyl ethyl benzene, and also such compounds as trivinyl benzene, divinyl ethers or divinyl ketones. These copolymers can have either a gel structure or a sponge structure. The quantity in which the crosslinking agent is used can be varied within wide limits. In the case of a gel-structure polymer, the crosslinking agent is used in a quantity of from 0.5 to 20 % and, in the case of a sponge-structure copolymer, in a quantity of from 2 to 50 %, based on the monomer total.

The production of macroporous polymers is described, for example, in U.S. Pat. No. 3,637,535, whilst the production of gel-form polymers is described, for example, in U.S. Pat. No. 2,366,007.

In general, any derivatives of cyclic imides of organic dicarboxylic acids can be used as the N-hydroxyalkyl imides. The following are mentioned as examples of dicarboxylic acids: phthalic acid, diglycolic acid, succinic acid, maleic acid, glutaric acid.

The following are mentioned as examples of N-hydroxyalkyl imides: N-hydroxymethyl succinimide, N-hydroxymethyl phthalimide, N-hydroxymethyl diglycolic acid imide, N-hydroxyethyl succinimide, N-hydroxyethyl phthalimide, N-hydroxyethyl diglycolic acid imide.

Suitable catalysts include any of the compounds known generically as Friedel-Crafts catalysts; they are known per se. Other suitable catalysts are compounds of the kind known as Lewis acids. The following compounds are mentioned by way of example: ferric chloride, stannic chloride, zinc chloride and zinc bromide. In addition, compounds of the kind which are converted into the corresponding halides under the effect of hydrogen halides, can also be used as catalysts. Examples of compounds such as these include compounds of zinc or iron, especially zinc oxide, zinc carbonate and ferric oxide. In addition, the use of compounds such as, for example, zinc oxide or zinc carbonate as catalysts has the advantage that these compounds catalyse the formation of the N-hydroxyalkyl dicarboxylic imides from the dicarboxylic imides and, for example, aqueous aldehyde solutions, with the result that the polyeric imidoalkyl compounds can be obtained virtually in a one container process. In the case of the N-hydroxymethyl phthalimide, it is possible, for example, to heat the phthalimide, aqueous formaldehyde, ethylene chloride, zinc oxide and polymer to boiling point, water and excess formaldehyde being distilled off together with ethylene chloride (with the addition of ethylene chloride to maintain stirrability). When no more water distills over, hydrogen chloride is introduced and the water formed during condensation removed from the reaction system. In this way, the polymeric imidoalkyl compounds are obtained without having to isolate intermediate products.

Examples of suitable swelling agents include halogenated hydrocarbons, such as ethylene chloride, methylene chloride, carbon tetrachloride, symmetrical tetrachloroethane, trichloroethylene or ethylene dibromide, alone or in admixture.

Reaction of the aforementioned copolymers with the cyclic N-hydroxyalkyl imides can be carried out, for example, by reacting the aforementioned components in the presence of the swelling agent and of the Friedel-Crafts catalyst at the boiling point of the swelling agent (from 30° to 150°C.), optionally accompanied by hydrogen halide or a compound which liberates hydrogen halide, the water of reaction being separated off.

Examples of compounds which liberate hydrogen halide include thionyl chloride, sulphuryl chloride and silicon tetrachloride.

The N-hydroxyalkyl imides are generally used in quantities of from 1 to 8 moles per 2 mols of aromatic nuclei present in the copolymer. The catalysts are generally used in quantities of from 2 to 50 %, based on the weight of the copolymer.

The condensation products of N-hydroxyalkyl imides and copolymer formed as an intermediate stage can be hydrolysed by known methods such as, for example, alkaline or acid hydrolysis, or reaction with hydrazine followed by acid hydrolysis in the presence or absence of solvents or swelling agents. For hydrolysis, the intermediate product can be separated off from the reaction medium, for example by filtration under suction and washing with the corresponding swelling agent in order to remove any adhering catalyst and soluble reaction products. If necessary, the isolated product can be additionally washed with an organic solvent miscible with water, such as methanol, ethanol, dioxan or tetrahydrofuran, and subsequently dried. The isolated product is then hydrolysed in an autoclave at temperatures of from 100° to 250°C. with an approximately 5 to 40 % aqueous or alcoholic solution of an alkali, such as sodium hydroxide or potassium hydroxide, or with an approximately 5 to 80 % aqueous solution of a mineral acid, such as for example hydrochloric acid, hydrobromic acid or sulphuric acid. On the other hand, the intermediate product can also be reacted with a 5 to 50 % aqueous or alcoholic solution of hydrazine hydrate at temperatures of from 50° to 100°C. In a preferred embodiment, this solution of hydrazine hydrate can contain other alkalis, especially caustic alkalis, in quantities of from 1 to 20 %. The reaction product can be isolated, washed with water and then heated with an aqueous solution of mineral acid (5 to 20 % concentration) in order to complete hydrolysis.

The aminoalkyl compounds prepared in accordance with the invention are weak base anion exchange resins with primary amino groups. The application of so-obtained anion exchange resins in the field of water treatment is well-known and for example described by R. Kunin and R. J. Myers in Ion Exchange Resins, J. Wiley & Sons, Inc. New York, 1951, Chapter 8). Alkylating of so-obtained weak base anion exchange resins in a well-known manner with formaldehyde/formic acid leads to weak base anion exchange resins with tertiary amino groups. The application of so-obtained anion exchange resins is known too eg. described in G. A. Cristy, R. E. Lembcke, Chem. Eng. Progr. 44 (1948) 417. Alkylation of the aminoalkyl compounds prepared in accordance with the invention with alkylating agents for example methyl-, ethyl-, propyl-chlorides and -bromides, dialkyl sulphates, alkylene oxides, halogen hydrins, polyhalogen compounds, epihalogydrins, and ethylene imines, leads to strong basic anion exchange resins with quaternary amonium groups. The application of these anion exchange resins is well-known too eg. described by U.S. Pat. No. 2,578,937.

The invention is illustrated in, but not restricted to, the following examples.

EXAMPLE 1

200 g of phthalimide, 120 ml of an aqueous formaldehyde solution (40 % by volume) and 600 g of ethylene chloride were stirred for 2 hours at 60°C. and then for 2 hours at 70°C., accompanied by the addition of 6 g of zinc oxide. The reaction mixture was then azeotropically dehydrated and 100 ml of ethylene chloride distilled off in order to remove the formaldehyde excess. 100 ml of fresh ethylene chloride and 50 g of a polystyrene bead polymer crosslinked with 2 % of divinyl benzenes were introduced into the resulting solution of N-hydroxymethyl phthalimide, after which the suspension was heated to reflux temperature over a period of 40 hours, accompanied by the introduction of 6 g of hydrogen chloride. At the same time, the water formed during condensation was removed through a separator.

After cooling, the reaction liquid was filtered under suction and the beads washed once with ethylene chloride and once with methanol. The beads were then heated for 6 hours to 80° – 90°C. with 300 ml of methanol, 100 g of hydrazine hydrate, 100 ml of 45 % sodium hydroxide, and 300 ml of water, filtered under suction, washed with water and dilute hydrochloric acid (1 : 5) and then heated for another 6 hours to 80° – 85°C. with 400 ml of 10% hydrochloric acid. After the phthalhydrazide formed had been washed out with dilute sodium hydroxide, the anion-exchanging resin formed was washed until neutral in a filter tube. Yield: 310 ml, acid-binding capacity with respect to N/10 HCl : 2.9 g-equiv./l.

EXAMPLE 2

The procedure was as in Example 1, except that 11 g of hydrogen bromide gas instead of hydrogen chloride gas were introduced. The yield of anion-exchanging resin amounted to 315 ml, and the HCl-binding capacity to 2.9 g-equiv./l.

EXAMPLE 3

25 g of a polystyrene bead polymer crosslinked with 2 % of divinyl benzene were caused to swell in 300 g of ethylene chloride and reacted in the presence of 5 g of ferric chloride accompanied by 1.3 g of HCl in accordance with Example 1.

After the reaction liquid had been filtered under suction, the condensation product was washed successively with ethylene chloride, methanol and water and then heated for 8 hours at 180° – 190°C. with 250 ml of 20 % hydrochloric acid in an enamel autoclave. The anion-exchanging resin formed was washed with water and dilute sodium hydroxide and, finally, was washed until neutral in a filter tube. Yield 105 ml, acid-binding capacity with respect to N/10 HCl: 2.8 g-equiv./l.

EXAMPLE 4

100 g of a styrene copolymer in bead form which had been crosslinked with 5 % of divinyl benzene and made porous by the addition of 65 %, based on the monomer weight, of a $C_{12}$-hydrocarbon mixture, were caused to swell in 500 ml of dichloroethane. 355 g of N-hydroxymethyl phthalimide and 10 g of ferric chloride were added. The mixture was heated under reflux to boiling point, the water formed during condensation being removed from the reaction system through a separator.

3 g of hydrogen chloride gas were introduced into the reaction vessel over a period of 6 hours.

After refluxing for 12 hours, 38 ml of water had been removed from the reaction system. The reaction liquid was cooled and filtered under suction, and the dichloroethane removed from the beads, which had been made weakly alkaline with dilute ammonia solution, by steam distillation and the phthalic acid separated off by heating for 12 hours to 180°C. with 300 ml of 25 % sodium hydroxide in a fine-steel autoclave.

The reaction product was washed until neutral with water, dilute hydrochloric acid, dilute sodium hydroxide and, finally, with water.

400 ml of an anion exchanger with an acid-binding capacity of 4 -equiv./l with respect to N/10 HCl were obtained.

EXAMPLE 5

100 g of a styrene bead polymer crosslinked with 4 % of divinyl benzene were caused to swell in 450 ml of dichloroethane. Following the addition of 355 g of N-hydroxymethyl phthalimide and 10 g of ferric chloride, the product was heated under reflux to boiling point, the water formed during the reaction being removed from the reaction system. 13.5 g of sulphuryl chloride, dissolved in 50 ml of dichloroethane, were added dropwise over a period of 6 hours. At the end of another 4 hours' refluxing, 32 ml of water had been removed from the reaction system.

Further treatment of the reaction product as in Example 4 gave 460 ml of an anion exchanger which had an acid-binding capacity of 3.2 g-equiv./l with respect to N/10 HCl.

EXAMPLE 6

525 ml of an anion exchanger with an acid-binding capacity of 2.3 g-equiv./l with respect to N/10 HCl were obtained by reacting 100 g of the porous styrene bead polymer used in Example 4 with N-hydroxymethyl phthalimide, accompanied by the dropwise addition of sulphuryl chloride, as described in Example 5.

EXAMPLE 7

100 g of a porous styrene bead polymer which had been obtained by polymerisation in the presence of 70 % of a $C_{12}$-hydrocarbon mixture, based on the monomer weight, and crosslinked with 6 % of divinyl benzene, were swollen in 500 ml of dichloroethane.

Following the addition of 355 g of N-hydroxymethyl phthalimide and 10 g of ferric chloride, the product was heated under reflux to boiling point, the water formed being removed from the reaction system.

12 g of thionyl chloride, dissolved in 50 ml of dichloroethane, were added dropwise over a period of 6 hours. At the end of another 6 hours' heating, 34 ml of water had been removed from the reaction system.

Further treatment of the reaction product as described in Example 4 gave 495 ml of an anion exchanger with an acid-binding capacity of 2.5 g.-equiv./l with respect to N/10 HCl.

EXAMPLE 8

400 ml of an anion exchanger with an acid-binding capacity of 2.8 g-equiv./l with respect to N/10 HCl were obtained by using 100 g of a styrene bead polymer crosslinked with 8 % of divinyl benzene and made macroporous by the addition of 55 % of n-octane, instead of the polymer used in Example 7.

EXAMPLE 9

75 g of a p-vinyltoluene bead polymer crosslinked with 4 % of divinyl benzene and 10 g of zinc chloride were introduced into a suspension of 200 g of N-hydroxymethyl phthalimide in 500 g of ethylene chloride. While 17 g of silicon tetrachloride were added to it in small portions, the product was heated to reflux over a period of 15 hours during which the water formed was removed from the reaction system. Working up of the reaction product as in Example 1 gave 260 ml of a weakly basic anion exchanger with an acid binding capacity of 3.2 g-equiv./l with respect to N/10 hydrochloric acid.

EXAMPLE 10

50 g of a styrene bead polymer crosslinked with 2 % of divinyl benzene were caused to swell in 320 g of ethylene chloride. Following the addition of 200 g of N-hydroxymethyl phthalimide and 5 g of ferric oxide, the product was heated to reflux over a period of 15 hours, during which water was removed from the reaction system and 5 g of hydrogen chloride introduced. The condensation product obtained was treated with hydrazine as described in Example 1, giving 260 ml of an anion exchanger with an acid-binding capacity of 2.8 g-equiv./l with respect to N/10 hydrochloric acid.

EXAMPLE 11

50 g of a polystyrene crosslinked with 8 % of trivinyl benzene were caused to swell in 400 g of methylene chloride. Following the addition of 200 g of N-hydroxymethyl phthalimide and 5 ml of stannic chloride, the product was heated to reflux over a period of 12 hours during which a total of 4 g of hydrogen chloride was introduced and an aqueous phase removed from the reaction system. Treatment of the reaction product with hydrazine as in Example 1 gave 120 ml of an anion exchanger with an acid-binding capacity of 2.8 g-equiv./l.

EXAMPLE 12

200 g of phthalimide, 130 g of 37 % aqueous formalin, 600 g of ethylene chloride and 2 g of sodium carbonate were heated for 4 hours to 60° – 70°C and then to reflux, water being removed from the reaction system. 200 g of a macroporous ethyl styrene (prepared in the presence of 100 % of isododecane, based on the weight of the monomers) crosslinked with 50 % of divinyl benzene and 20 g of ferric chloride were introduced into the resulting suspension of N-hydroxymethyl phthalimide. The product was heated to reflux over a period of 12 hours, during which 5 g of hydrogen chloride were introduced and the water of reaction removed from the reaction system. The reaction product thus obtained was treated with hydrazine as in Example 1, giving 950 ml of an anion exchanger with an acid-binding capacity of 0.35 g-equiv./l.

We claim:

1. A process for the production of a synthetic, anion-exchange resin, in which at least one crosslinked, insoluble organic polymer containing at least one aromatic nucelus is condensed with at least one N-hydroxyalkyl-imide in the presence of at least one swelling agent and of at least one Freidel-Crafts catalyst, said at least one N-hydroxyalkyl-imide being used in an amount of from 1 to 8 moles per each 2 moles of aromatic nuclei present in said organic polymer and said catalyst being present in an amount of from 2 to 50% by weight, based on the weight of said organic polymer, the water formed during the condensation reaction is continuously removed from the reaction mixture, and the reaction product thus obtained is hydrolysed.

2. The process of claim 1 in which the condensation is carried out in the presence of a hydrogen halide.

3. The process of claim 1 in which the condensation is carried out in the presence of at least one compound which liberates a hydrogen halide.

4. The process of claim 1 in which the condensation is carried out in the presence of at least one Lewis acid.

5. The process of claim 1 in which the catalyst is a compound which can be converted into the corresponding halide under the effect of hydrogen halide.

6. The process of claim 1 in which the catalyst is ferric oxide.

7. The process of claim 1 in which the catalyst is zinc oxide.

8. The process of claim 1 in which the catalyst is zinc carbonate.

* * * * *

UNITED STATES PATENT AND TRADEMARK OFFICE
CERTIFICATE OF CORRECTION

PATENT NO. : 3,925,264
DATED : December 9, 1975
INVENTOR(S) : Herbert Corte et al It is certified that error appears in the above—identified patent and that said Letters Patent are hereby corrected as shown below:

Cols. 1 and 2, the third entry of Table (I), the four missing entries should read, respectively:

-- II --, -- 3 --, -- 2.08-- and -- 1.58 --

Signed and Sealed this sixth Day of April 1976

[SEAL]

Attest:

RUTH C. MASON
*Attesting Officer*

C. MARSHALL DANN
*Commissioner of Patents and Trademarks*